Patented Mar. 5, 1940

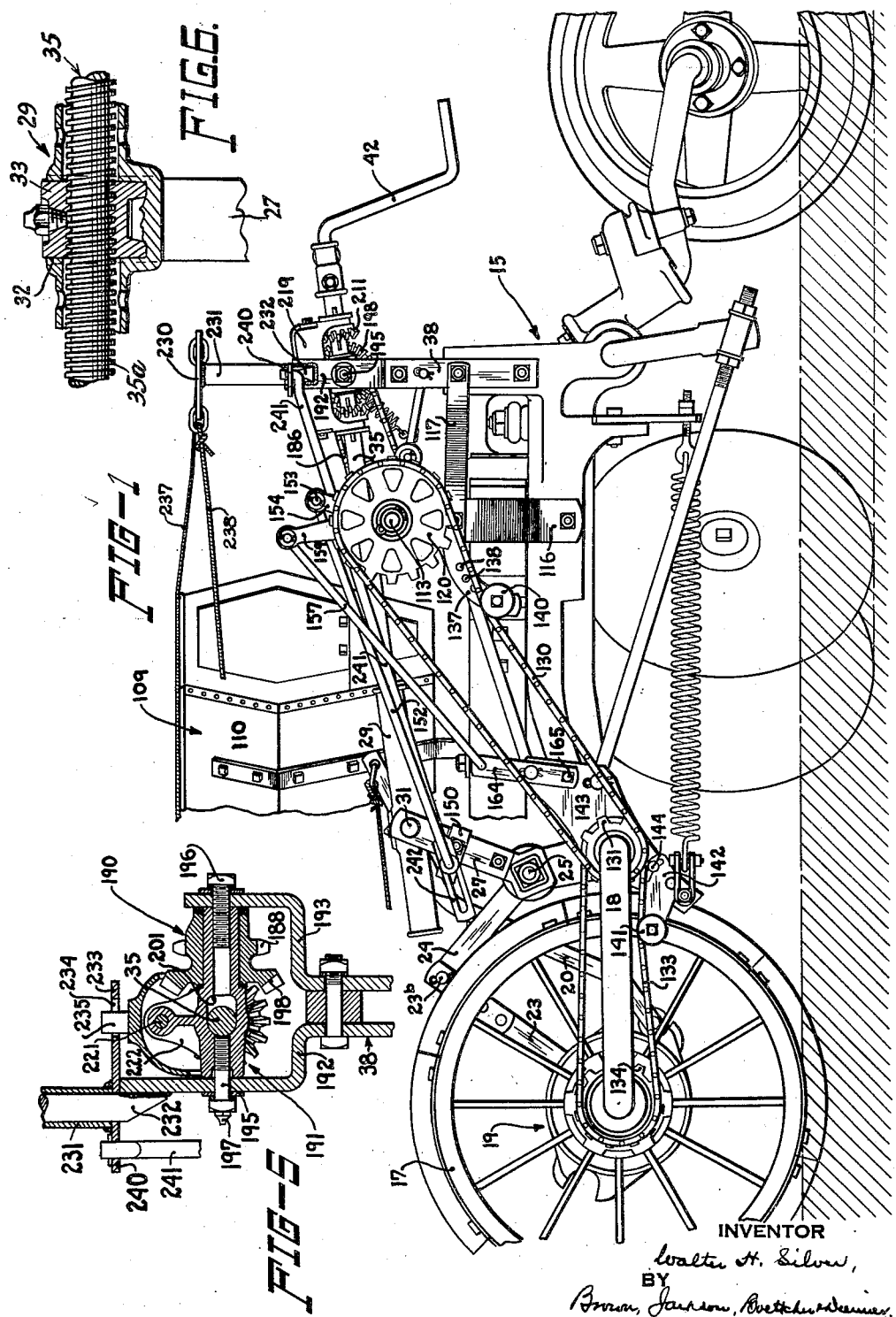

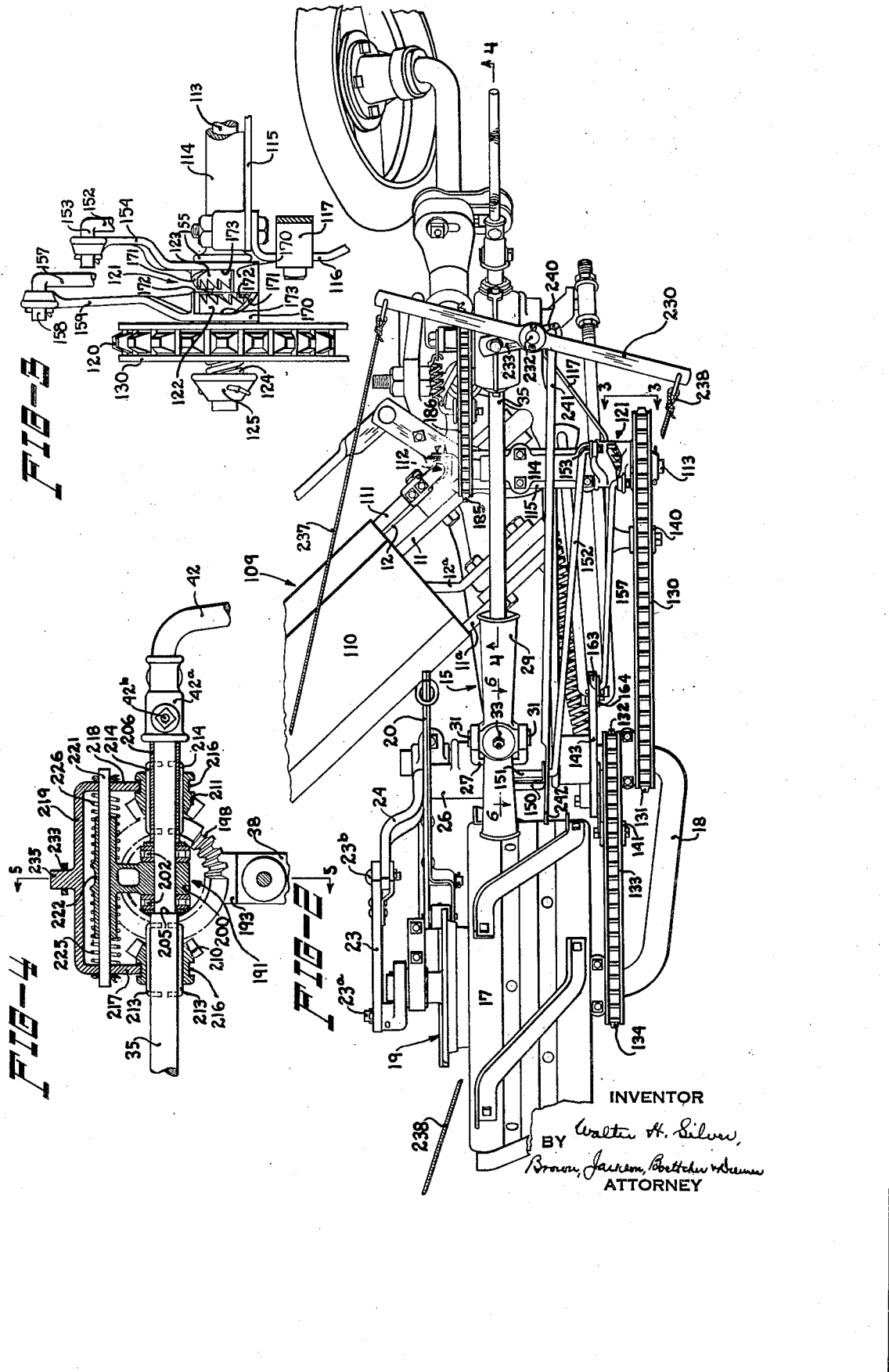

2,192,333

UNITED STATES PATENT OFFICE 2,192,333

TILLAGE IMPLEMENT

Walter H. Silver, Moline, Ill., assignor to Deere & Company, Moline, Ill., a corporation of Illinois Application October 23, 1936, Serial No. 107,156

29 Claims. (Cl. 111—68)

The present invention relates generally to agricultural machines, and is more particularly concerned with machines carrying operating units which are driven from a ground wheel and which also are raised and lowered into and out of transport position.

The principal object of the present invention is the provision of means for driving the operating unit, and also for driving the raising and lowering mechanism. More specifically, it is an object of the present invention to provide, in a seeding implement or the like, means for driving the seed selecting shaft from a ground wheel, with a connection from said means to the adjusting mechanism for raising and lowering the seeding unit in its operating position. In this connection, it is a further object of the present invention to provide means for interrupting the drive from the ground wheel to the seeding unit, which is not affected by depth adjustments but which is, nevertheless, fully responsive to a movement of the seeding unit into and out of its transport position for automatically interrupting or restoring the driving connection between the seed selecting shaft and the ground wheel that is adapted to drive the same.

Another important object of the present invention is the provision of means for automatically terminating the power operated depth adjustments when the limit of the adjustment in either direction is approached.

Still another object of the present invention is the provision of new and improved clutch mechanism controlling the delivery of power from the ground wheel to the seed selecting shaft which comprises two relatively movable parts operative, by virtue of their relative movement, to engage and disengage the drive, but in which the drive is not affected by the simultaneous movements of said parts together. In this connection, it is a further object of the present invention to connect one of said members to the depth adjusting means and the other member with the ground wheel, whereby the operation of the depth adjusting mechanism swings the associated parts thereof and the wheel generally together, so that the disconnect clutch will not be operated, but which is operated practically simultaneously with the raising and lowering means that shifts the position of the wheel relative to parts of the depth adjusting means.

These and other objects and advantages of the present invention will be apparent to those skilled in the art after a consideration of the following detailed description, taken in conjunction with the accompanying drawings.

In the drawings:

Figure 1 is a side view of the rear portion of a power lift disk tiller equipped with a seeding unit;

Figure 2 is a top or plan view of the portion of the machine shown in Figure 1;

Figure 3 is an enlarged fragmentary view of the disconnect clutch controlling the drive from the ground wheel to the seed selecting shaft, and corresponding to a view taken approximately along the line 3—3 of Figure 2, except that the clutch parts for better illustration are shown in their disconnected position or the position they assume when the earth working disks are in raised or inoperative position;

Figure 4 is an enlarged fragmentary section taken through the reversing gear means by which the adjusting mechanism can be operated from power derived from the ground wheel, and corresponding to a section taken along the plane of the line 4—4 of Figure 2;

Figure 5 is a section taken along the line 5—5 of Figure 4; and

Figure 6 is a partial section taken along the line 6—6 of Figure 2.

Referring now to the drawings, it will be noted that, for convenience of illustration, the principles of the present invention have been shown as embodied in a disk tiller of the type shown in my prior Patent No. 1,885,955, issued November 1, 1932, to which reference may be had if desired. In order to facilitate an understanding of the present invention, parts of the present disk tiller that correspond to similar parts described in my aforesaid patent have been given the same reference characters.

Referring now more particularly to Figures 1 and 2, the frame of the implement comprises generally parallel members 11 and 12 that extend diagonally fore and aft, auxiliary bars 11a and 12a being provided where desirable. The rear ends of said frame members are pivotally connected with a rear truck 15 by a vertical pivot (not shown) about the axis of which the frame may be adjustably shifted relative to the rear truck 15.

The forward end of the rear truck 15 is supported by a land wheel 17 movably mounted to rotate on the horizontally turned portion of a crank axle 18, the rear end of which is also horizontally turned and is suitably journaled in and extends through a horizontal bearing in the truck 15. On the end of the crank axle 18 adjacent the furrow-ward side of the land wheel 17 is mounted a standard half revolution clutch 19 which, when thrown into operation, cooperates with said wheel to raise the implement frame relative to the supporting means therefor, by power derived from said land wheel. Clutches of this type are well known in the art and usually include a driving member fastened to the wheel 17 and a driven member adapted to be thrown into clutching engagement with the driving member by any suitable means, such as a tripping lever 20. The driven member, in the power lift clutch illustrated, is provided with a crank pin 23a which has suitable connection with the frame of the implement through a thrust or lifting link 23 so that when the driven member is revolved through the lifting portion of its cycle, an upward thrust will be transmitted through the lifting link 23 and, at the same time, the crank axle 18 and land wheel 17 will be swung in a downward direction relative to the frame, thereby raising the latter with respect to the ground surface.

The upper end of the thrust link reacts against a main depth adjusting arm 24, to which the upper end of the thrust link 23 is pivotally connected, as by a pin 23b. The depth adjusting arm 24 is securely fastened in any suitable manner to a transversely disposed rock shaft 25 journaled in a horizontal sleeve portion 26 which is formed integral with and extends upwardly from the forward portion of the rear tuck 15. The opposite or land side end of the rock shaft 25 has fixed thereto an upwardly extending arm 27 to which depth adjusting mechanism, which can be controlled either manually or by power, is connected.

The operating depth of the disks is adjusted by rotating the rock shaft 25 in one direction or the other. For example, to raise the disks so as to operate at a less depth than is illustrated in Figure 1, the arms 24 and 27 are swung forwardly and this exerts a downward thrust through the link 23 against the crank pin 23a. The reaction of this force raises the frame relative to the land wheel 17, the crank axle 18 swinging during this motion relative to the truck 15. As best shown in Figure 2, the upper end of the arm 27 is bifurcated and receives a barrel casting 29 which is provided with a pair of diametrically opposite trunnions 31 by which the member 29 is pivoted to the upper end of the arm 27. The member 29 is provided with a vertical bore 32 (Figure 6) which rotatably receives a nut 33 having a threaded longitudinal bore in which the forward threaded end 35a of a depth adjusting crank screw 35 extends, as more completely set out in my prior patent described above. The forward and rear ends of the member 29 are flared, as best shown in Figure 2, and by reason of the pivotal mounting of the trunnions 31 of the member 29 in a horizontal plane, said member is permitted to rock in a vertical plane, and as the nut 33 is so mounted in the member 29 that it may rotate therein about an axis at right angles to the trunnion axis 31, 31, said nut is capable of universal movement with respect to the arm 27. The rear portion of the crank screw 35 is rotatably supported in the upper end of a standard 38 and is provided at its rear end with a crank handle 42 by which said crank screw 35 may be rotated. Preferably, according to the principles of the present invention, means is provided, as will be described below, for rotating the depth adjusting crank screw 35 from the land wheel 17, but the crank 42 is provided so as to permit a manual depth adjustment whenever it may be desired to adjust the implement in this manner. The rear end of the crank screw 35 is supported in the bracket 38 by suitable means that holds the crank screw against longitudinal displacement, as will be described below in connection with the means for rotating the crank screw 35 from the land wheel 17.

According to the principles of the present invention, the agricultural machine illustrated includes a seeding attachment, indicated in its entirety by the reference numeral 109, which comprises a seed box 110 having seed selecting mechanism in the lower portion thereof driven by means of a seed selecting shaft 111 which is disposed above and substantially parallel with respect to the frame bar 12. The seed selecting shaft 111 is connected by means of a universal joint 112 to a drive shaft 113 that is journaled in a casting or other suitable member 114 fixedly supported upon a pair of bearing brackets 115 and 116 that are fixed to the main casting of the rear truck 15. A bracing bracket 117 extends from the upper end of the bracket 116 rearwardly, as best shown in Figures 1 and 2.

The shaft 113, which drives the seed selecting shaft 111 through the universal joint 112, is driven from the land wheel 17, and to this end the outer portion of the shaft 113 receives a sprocket wheel 120 (Figures 1 and 3) which is rotatable thereon but which is adapted to be connected therewith by a jaw clutch mechanism, indicated in its entirety by the reference numeral 121. The clutch mechanism 121 comprises a clutch member 122 formed integral with the hub of the sprocket wheel 120 and a second clutch member 123, keyed or otherwise secured to the shaft 113. A compression spring 124 embraces the outer end of the shaft 113, on the outer side of the sprocket wheel 120, and bears against the outer face of the latter and against a collar 125 fixed to the outermost end of the shaft 113. Thus, the sprocket 120, with its clutch hub 122, is urged for axial movement relative to the shaft 113 so as to cause the teeth of the clutch members 122 and 123 to engage, whereby the rotation of the sprocket wheel 120 can drive the shaft 113. The sprocket 120 is driven by means of a chain 130 which is trained at its upper end over the sprocket 120 and over the sprocket section 131 (Figure 2) of a double sprocket element which is journaled for rotation about an axis coinciding with the rear horizontally turned portion of the crank axle 18. The companion sprocket section 132 of the double sprocket element receives the rear end of a sprocket chain 133 which, at its forward end, is trained over a sprocket 134 fixed to be rotated by the land wheel 17. The reenforcing brace 117, at its forward end, includes an extension 137 having a plurality of holes 138 formed therein to receive an idler 140 in a number of adjusted positions. The idler 140 cooperates with the sprocket chain 130 in maintaining the proper tension in the latter. Similarly, an idler 141 is carried for adjustment by a bracket 142 on a plate or bracket member 143 which is suitably fixed in any desired manner to the journal portion of the crank axle 18. A bolt and slot construction 144 permits the disposition of the idler 141 in a position to secure the proper tension in the sprocket chain 133.

In operation, therefore, assuming that the clutch 121 is engaged, the forward travel of the machine causes the land wheel to rotate in a counterclockwise direction, as viewed in Figure 1, and this drives the shaft 113 through the sprocket chains 130 and 133 and the sprockets 120, 131 and 132. The rotation of the shaft 113 drives the seed selecting shaft 111 through the universal joint 112. Also, as is conventional practice in power lift clutches, whenever the operator trips the lever 20, the power lift mechanism 19 is actuated and the counterclockwise movement (Figure 1) of the land wheel 17 swings the crank pin 23a and exerts an upward thrust through the link 23 against the arm 24. Since this arm is held in fixed position relative to the implement frame by the adjusting mechanism, to be described later, the frame is raised relative to the land wheel 17, the crank axle 18 swinging downwardly about its journal support in the rear truck frame, in a counterclockwise direction relative thereto as viewed in Figure 1. When the implement is to be thus raised from an operating position to a transport position, it is desirable to interrupt the drive from the land wheel 17 to the seed selecting shaft 111, and according to the principles of the present invention this is done by disengaging the jaw clutch 121. The means for controlling the clutch 121 will now be described.

Engagement and disengagement of the clutch 121 is controlled through mechanism which causes the clutch to be engaged whenever the implement is lowered into operating position, and to be disengaged whenever the implement is in a raised or inoperative position, independently of the particular operating position of the implement under the control of the depth adjusting mechanism. For example, note that whenever the crank screw 35 is rotated, either by the hand crank 42 or by the power driven mechanism to be described later, the arm 27 is swung in one direction or the other, and this, in turn, swings the crank axle 18 and raises or lowers the position of the disks. In other words, whenever the arm 24 connected with the arm 27 through the shaft 25, is swung downwardly, the crank axle 18 is also swung downwardly. Similarly, when the arm 24 is swung upwardly, the crank axle 18 is also swung upwardly. However, whenever the disks are to be raised to their inoperative position, the crank axle 18 is also swung downwardly with respect to the rear truck 15. In the implement illustrated, the lifting connections are such that the crank axle 18, when the implement is in a raised position with the depth adjusting mechanism adjusted for deepest plowing position, is in almost the same position with respect to the frame of the implement as when the implement is in a lowered position but with the depth adjusting mechanism set for shallowest operating position. That is, when the implement is raised from its deepest plowing position, the disks clear the ground by a relatively small amount, although the depth adjusting mechanism can be so set that when the implement is lowered, the disks will just scrape the top of the ground. However, in one instance the seed mechanism should be operating, and in the other instance the seed mechanism should not be operating. For this reason, it is not practical to provide a clutch throw-out mechanism in the form of a single cam or other means connected to an arm fixed to the crank axle 18, as is common in other implements. According to the principles of the present invention, the means for interrupting the seeding mechanism is made independent of the depth adjusting position of the parts and entirely dependent upon the actuation of the raising and lowering means for bringing the implement into and out of its transport position.

A bracket 150 is fixed to the arm 27 and extends outwardly therefrom and receives the inwardly bent end 151 (Figure 2) of a link 152 that extends rearwardly and upwardly and has an outwardly bent end 153 disposed in an opening in the upper end of an arm 154 (Figure 3) mounted for rotation with respect to the clutch member 123. Preferably, the latter has a shoulder 155 against which the inner end of the arm 154 bears. A second link 157 has an outwardly bent end 158 disposed in an opening in a second arm 159 that is mounted for rotation on the clutch hub section 122 of the sprocket wheel 120, the outer face of the hub portion of the arm 159 bearing against the inner face of the sprocket or a shoulder thereon, as may be desired. The link 157 extends forwardly and downwardly and is provided with an inwardly bent end 163 (Figure 2) formed as a hook and engaging in the upper end of an auxiliary bracket 164 bolted, as at 165 (Figure 1), to the upper portion of the plate member 143 that is fixed to swing in a vertical plane with the crank axle 18.

Each of the aforesaid arms 154 and 159 carries suitable cam mechanism by which relative movement between the arms occasions the engagement and disengagement of the clutch 121. Each of the arms is provided with a cam hub 170 encircling the associated clutch member, and each cam hub includes a pair of inclined camming sections 171 and a pair of flat or dwell portions 172 that are spaced 180° apart, with a notch or space 173 between the end of each dwell portion and its associated inclined portion 171. In Figure 3 but one cam section and its associated dwell portion provided on each of the arms 154 and 159 appear, the opposite cam section and dwell portion being on the other side of the lever hubs. When the members 154 and 159 are in one relative angular position, they will have been forced apart, into the position shown in Figure 3, with the raised or dwell portions 172 of one arm in contact with one of the raised or dwell portions 172 of the other arm. In this position, the clutch members 122 and 123 are separated and this is the position they occupy when the disks are in raised or inoperative position and the drive to the seed selecting shaft is disconnected. However, when the power lift is actuated to lower the disks into operating position as shown in Figure 1, the arm 159 is swung in a direction upwardly from the plane of the paper in Figure 3, or into the position in which it is shown in Figure 1, and the cam sections 170 will be interlocked with the raised or dwell portions of one in contact with or disposed in the lowered or notched portions 173 of the other member, thereby permitting the clutch members 122 and 123 to be engaged in driving relation under the bias of the spring 124. Thus, when one arm is moved with respect to the other, the clutch members 122 and 123 are engaged or disengaged, but if the arms 154 and 159 move together and do not have any material movement relative to one another, the position of the clutch members 122 and 123 is not affected. It may be well to point out here that when one arm is moved with respect to the other as above described, the camming section 171 of one arm as shown in Figure 3 rides on the camming section of the other arm that is positioned 180° from the camming section 171 of such other arm shown in Figure 3.

The position of the rock shaft 25, as described above and in my prior patent, controls the depth of operation of the implement, and its position is controlled, in turn, by the depth adjusting crank screw 35. By reason of the connection of the cam arm 154 with the arm 27 on the rock shaft 25, the position of the arm 154 relative to the frame of the implement changes as the implement is adjusted for different depths of operation. However, inasmuch as the crank axle 18 is rotated whenever the depth adjusting mechanism is operated, the other cam arm 159, connected with the crank axle 18 by the link 157 and the bracket 164, will also be rotated and in the same direction that the depth adjusting movements of the arm 27 rotate the other cam arm 154. Hence, during all depth adjustments, the cam arms 154 and 159 will remain in substantially the same relative position with respect to each other during the full range of operation of the depth adjusting mechanism. However, whenever the power lift clutch 19 is operated, the crank axle 18 will be swung but the arm 24 will remain stationary, the crank axle 18 swinging through substantially the same angle entirely irrespective of the particular position of the depth adjusting arms 24 and 27. As a result of this arrangement, the cam arms 154 and 159 will experience substantially the same amount of relative movement when the implement is raised and lowered, and will function to disengage completely the clutch 121 when the implement is raised, and will likewise function to permit full engagement of the clutch 121 when the implement is lowered, regardless of the position of the depth adjusting mechanism.

As mentioned above, the present invention contemplates adjusting the depth of operation of the disks by means of power derived from the land wheel 17. To this end, a sprocket 185 (Figure 2) is fixed to the inner end of the shaft 113 adjacent the universal joint 112, and a sprocket chain 186 is trained over the sprocket 185 and over a second sprocket 188 which forms a part of a compound sprocket and gear member 190 (Figure 5) that is journaled over a supporting member 191 carried for rocking movement between the spaced upper ends of brackets 192 and 193 that form the upper end of the standard 38. A pair of cap screws 195 and 196 serve to rockably support the member 191, and one of the cap screws is provided with a lubricating bore communicating with a lubricant nipple 197. Preferably, although not necessarily, the compound sprocket and gear member 190 is integral and includes a bevel gear 198.

The supporting member 191 includes a central section 200 that is apertured, as at 201, and receives the depth adjusting shaft 35. Thrust bearings 202 are fixed on opposite sides of the central section 200 to the shaft 35 and bear against the member 191 so as to prevent axial or longitudinal movement of the shaft 35. Preferably, the shaft 35 is shouldered, as at 205, and the bearing 202 is disposed against this shoulder. On the other side of the member 191 the shaft 35 is reduced in diameter and carries a sleeve 206 which bears against the other bearing 202 and holds the same against the central section 200 of the member 191. The hub portion 42a of the crank 42 is secured in place by any suitable means, such as a set screw 42b, and the crank 42 serves to hold the sleeve 206 in place.

A pair of bevel pinions 210 and 211 are keyed to the crank screw 35 by pairs of keys 213 and 214, and the pinions 210 and 211 have free sliding axial movement along the keys 213 and 214. The keys 214 also have the additional function of holding the sleeve 206 in position on the crank screw 35 independently of the crank handle 42. Each of the bevel pinions 210 and 211 is provided with a shifter groove 216, and the bifurcated arm portions 217 and 218 of a bowl-shaped casting 219 are engaged in the grooves 216 and serve to move said pinions simultaneously, one into engagement with the bevel gear 198 and the other out of engagement therewith. The shifter casting 219 is supported on the member 191 by means of a rod 221 received in openings in the end portions of the casting 219 and slidingly disposed in a longitudinally extending boring in a sleeve portion 222 preferably formed integrally with the member 191. A pair of compression springs 225 and 226 are disposed between the ends of the sleeve portion 222 and the corresponding ends of the casting 219. These springs function to normally retain the casting member 219 in a neutral position with respect to the supporting member 191 and to thereby hold both of the bevel pinions 210 and 211 out of mesh with the driving bevel gear 198.

The shiftable casting member 219 may be moved from its neutral position to either of its alternative positions by means of a double-armed lever 230 (Figure 2) which is fixed to the upper end of a sleeve 231 that is journaled upon a vertically extending rod 232 suitably fixed, as by welding or the like, to the upper end of the bracket 192, as best shown in Figures 1 and 5. An arm 233 is welded to the lower end of the sleeve 231, and is provided with a slot 234 through which a lug 235, that is formed integrally with the casting member 219, projects. Two ropes or cables 237 and 238 are connected, respectively, to the ends of the double-armed lever 230 and are extended to the operator's position on the tractor or other source of draft propelling the machine.

By exerting a pull on one of the cables, the lever 230 will be rocked in one direction or the other, and this will cause the arm 233 to move the casting 219 in one direction longitudinally of the shaft 35, thus bringing one of the bevel pinions 210 and 211 into mesh with the gear 198. As soon as the gear teeth are engaged, the crank screw shaft 35 will be rotated in one direction so as to rock the arms 24 and 27 and the connecting rock shaft in one direction, thus adjusting the depth of operation. When the proper depth of operation is reached, the operator releases the pull on the cable and one of the springs 225 and 226 moves the casting 219, and the bevel pinions 210 and 211, back into their neutral position. As is obvious, pulling on the other rope will engage the other pinion and will rotate the adjusting shaft 35 in the other direction.

It is desirable to provide means to prevent the inadvertent continued operation of the depth adjusting crank in either direction from over-running the limit of adjustment, and to this end means has been provided for disengaging either bevel pinion from the bevel gear 198 when the crank screw 35 has been rotated to dispose the arm 27 in either of its limiting positions. Referring again to Figure 5, an arm 240, which may be an extension of the arm 233, is welded to the lower end of the sleeve 231 and is connected by means of a link 241 with the arm 27. Preferably, this connection is in the nature of a lost motion connection and comprises an elongated slotted end 242 which, as best shown in Figures 1 and 2, receives the inwardly bent end 151 of the link 152 and is slidable with respect thereto within the limits defined by the slot. The slot is of such length that whenever the arm 27 approaches either of its limiting positions, the rod 241 will be actuated to positively move the shift casting 219 into its neutral position, carrying the pinions 210 and 211 out of engagement with the gear 198.

Thus, as will be clear from the above description, I have provided depth adjusting mechanism that is actuated by power derived from one of the ground wheels of the implement; more specifically, I have provided means for driving the seed selecting shaft of the seeding mechanism and means for driving the depth adjusting mechanism from the means that drives the seed selecting shaft. I have also provided means for interrupting the drive to the seed selecting shaft whenever the implement is raised into its transport position, such means being entirely independent of any particular position of the depth adjusting mechanism. Further, I have provided means for discontinuing the power driven depth adjusting means whenever the parts reach either of their limiting positions.

While I have shown and described above the particular structure chosen to illustrate the principles of the present invention, it will be apparent that my invention is not to be limited to the particular details, but that, in fact, widely different means may be employed in the practice of the broader aspects of my invention.

What I claim, therefore, and desire to secure by Letters Patent is:

1. An agricultural machine comprising means serving as a frame, a ground wheel therefor, earth working tool means carried by said frame, means for raising and lowering said tool means, and means deriving power from said ground wheel independently of said raising and lowering means for adjusting the position of said tool means to vary the depth of penetration thereof.

2. An agricultural machine comprising a frame, tool means carried thereby, a ground wheel for said frame, means for raising and lowering said tool means into and out of transport position, depth adjusting means carried by said frame for disposing said tool means in various adjusted positions, means connecting said depth adjusting means with said raising and lowering means whereby the latter reacts against said depth adjusting means, and means deriving power from said ground wheel for actuating said depth adjusting means.

3. An agricultural implement comprising means serving as a frame, ground supporting wheel means therefor, seed selecting mechanism, ground engaging tool means associated therewith and carried on said frame, means for driving said seed selecting mechanism from said ground wheel means, and means for adjusting the position of said frame and said tool means relative to the ground surface by power derived from the driving means for said seed selecting mechanism.

4. An agricultural machine comprising the combination of a frame, means including a vertically swingable wheel for supporting said frame, an operating unit carried at least in part by said frame and raised and lowered by the swinging movement of said wheel, means including a shaft journaled on said frame for driving said operating unit from said vertically swingable wheel, and means also driven from said shaft for swinging said wheel to raise and lower said unit.

5. An agricultural machine comprising the combination of a frame, supporting means therefor including a generally vertically swingable ground wheel, a seeding unit supported at least in part on said frame and movable with respect thereto, a shaft journaled on said frame, a seed selecting shaft for said seeding mechanism, universal joint means connecting said shafts, means for rotating the first shaft from said ground wheel, and means on said frame and driven from said first shaft for raising and lowering said frame and said seeding unit.

6. An agricultural machine comprising a wheel supported frame, vertically shiftable wheel means for said frame, means driven from said wheel means for raising and lowering said frame relative thereto, means separate from said first means and including a rotatable shaft for disposing said frame relative to said wheel means in various adjusted positions between the raised and lowered positions thereof, and means actuated by the rotation of the wheel means for driving said shaft.

7. An agricultural implement comprising a frame, a supporting wheel therefor, a swinging crank axle connecting said wheel with said frame, an arm connected with said crank axle for swinging the latter, a swiveled nut carried by said arm, a rotatable shaft supported on said frame and having a screw threaded end engaging said nut, means for preventing axial movement of said shaft, and means driven from said ground wheel for rotating said shaft optionally in either direction to raise and lower said frame relative to said ground engaging wheel.

8. An agricultural machine comprising a frame, a shaft rotatably supported on said frame, means including a ground wheel for supporting said frame, means for driving said shaft from said wheel, including a driving bevel gear journaled on said frame and connected to be driven from said wheel, a pair of oppositely disposed pinions slidably mounted on said shaft and adapted for optional engagement with opposite sides of said bevel gear, a lever pivoted on said frame and having operating cables extending from opposite ends thereof, and means actuated by said lever for engaging either of said pinions and disengaging the other pinion from said gear.

9. An agricultural machine comprising the combination of a frame including a ground wheel for supporting said frame, a swingable crank axle connecting said wheel with said frame, a lever supported for rocking movement on said frame and connected with said crank axle for raising and lowering the frame relative to said wheel, a shaft supported at one end of said frame and having an operating crank, a nut swiveled on said lever, the other end of said shaft being threaded and disposed in said nut, whereby rotation of said crank acts through said lever for raising and lowering said frame, a driving bevel gear supported for rotation on said frame and driven from said ground wheel, a pair of oppositely disposed pinions mounted for sliding but non-rotatable movement on said shaft, a member connected with said pinions so as to move them together longitudinally of said shaft, spring means normally acting to maintain both of said pinions out of engagement with said driving bevel gear, a control lever for shifting said member in either direction in order to drive the shaft from said bevel gear in one direction or the other, and a connection between said operating lever and said first mentioned lever for automatically disengaging either of said pinions from the driving bevel gear after a predetermined movement of said first lever.

10. An agricultural machine comprising a frame, a crank axle pivoted thereto, a ground wheel journaled on said crank axle and movable relative to said frame, an adjusting lever mounted on said frame for swinging said crank axle to raise and lower said frame relative to said ground wheel, means including a rotatable shaft on said frame for swinging said adjusting lever, means including a controlled reversible gear for actuating said shaft from said ground wheel, and means connecting said reversing gear and said adjusting lever for disabling said reversing gear when the end of adjustment has been reached.

11. An agricultural machine comprising, in combination, a frame, a crank axle journaled thereon, a ground wheel carried on said crank axle, a pivotally mounted arm connected to swing said crank axle vertically for raising and lowering said frame, a rotatable shaft carried on said frame and having a threaded connection with said arm for swinging the latter to raise and lower said frame when said shaft is rotated, gear means driven from said wheel and connected to optionally rotate said shaft in either direction and to take a neutral position in which said shaft serves to hold said pivotally mounted arm in position, means including a link extending from said reversing gear to said pivotally mounted arm, and means connecting said link with said arm at a point spaced from the pivot axis thereof so that when the arm reaches either extreme of its movement the reversing gear will be shifted into its neutral position.

12. An agricultural machine comprising an operating unit, means including a generally vertically movable ground wheel for supporting said unit, means for driving said operating unit from said wheel, means for raising and lowering said unit relative to said wheel for determining the overating position thereof, mechanism reacting against said last mentioned means for also raising and lowering said unit relative to said wheel into and out of a transport position, and means controlled by the relative movement between said last mentioned means and said wheel for interrupting the drive to said operating unit whenever the later is raised into its transport position.

13. An agricultural machine comprising a frame, seeding mechanism carried thereby and including a seed selecting shaft, a generally vertically movable ground wheel connected with said frame, driving means extending from said wheel to said shaft for driving the latter and including clutch mechanism, depth adjusting means operatively connected with said wheel for moving the same, means also connected with said wheel for raising and lowering said frame into and out of transport position, and means for controlling said clutch mechanism in response to relative movement between said depth adjusting means and said raising and lowering means.

14. An agricultural implement comprising a frame, seeding mechanism carried thereby and including a seed selecting shaft, ground engaging supporting means for said frame including a ground wheel and a crank axle swingably connecting said wheel with said frame, a power lift unit operatively associated with said wheel, a depth adjusting lever connected with said power lift unit and operable to swing said crank axle for adjusting the operating position of said seeding mechanism, means deriving power from said ground wheel for actuating said lever, said power lift mechanism reacting against said lever for also swinging said crank axle to raise and lower the frame, means for driving said seed selecting shaft from said wheel including a clutch, and means for actuating said clutch whenever said power lift mechanism shifts said crank axle relative to said depth adjusting lever.

15. An agricultural machine comprising a frame, seeding mechanism carried thereby and including a seed selecting shaft, a ground wheel, a generally vertically swingable crank axle connecting said ground wheel with said frame, a power lift clutch carried by said ground wheel, a depth adjusting lever receiving the reaction of said power lift clutch, means for swinging said depth adjusting lever and reacting through said power lift clutch for raising and lowering the frame relative to said wheel and simultaneously swinging said crank axle with said depth adjusting lever, means for driving said seed selecting shaft from said wheel including a clutch and a pair of cam members, one movable relative to the other in disconnecting the drive to said seed selecting shaft, a link connecting one of said members with said depth adjusting lever, and a second link connecting the other cam member with said crank axle, whereby said cam members are moved together when said depth adjusting means is actuated and are moved relative to one another to disconnect the driving whenever the power lift clutch is actuated to swing the crank axle relative to said depth adjusting lever.

16. An agricultural machine comprising a frame, supporting means therefor including a vertically movable ground wheel, an operating unit carried by said frame, means including a disconnect clutch for driving said unit from said wheel, means for adjusting the position of said wheel relative to the frame and including an arm and a rotatable shaft connected to swing said arm, reversible means for rotating said shaft in either direction from said ground wheel, means reacting against said arm to shift said wheel relative to said arm, means controlled by relative movement between the wheel and said arm for operating said disconnect clutch, and means actuated by the movement of said arm for controlling said reversible shaft rotating means.

17. In an agricultural implement, the combination of seed selecting mechanism, ground engaging tool means associated with said seed selecting mechanism, a drive shaft for said mechanism, depth adjusting mechanism for said tool means, and a connection between said drive shaft and said depth adjusting mechanism for actuating the latter from said shaft.

18. An agricultural implement comprising a frame, a ground engaging supporting wheel therefor, seed selecting mechanism on said frame, a drive shaft for said seed selecting mechanism driven from said ground wheel, ground engaging tool means associated with said seed selecting mechanism and carried on said frame, means for raising and lowering said tool means by power derived from said ground wheel, depth adjusting mechanism for disposing said frame and said tool means in various adjusted positions between the raised and lowered positions thereof, and means deriving power from said drive shaft for actuating said adjusting mechanism.

19. An agricultural machine comprising a frame, supporting means therefor, said selecting mechanism including a drive shaft therefor, ground engaging tool means associated with said seed selecting mechanism, means for raising and lowering said tool means, manually operable depth adjusting means for disposing said tool means in various positions between the raised and lowered positions thereof, and means for operating said depth adjusting means by power derived from said drive shaft independently of the raising and lowering means.

20. An agricultural machine comprising the combination of a frame, supporting means therefor including a ground wheel, a seeding unit supported at least in part on said frame and movable with respect thereto, a shaft journaled on said frame, a seed selecting shaft for said seeding mechanism, universal joint means connecting said shafts, means for driving said first shaft, and means on said frame and driven from said first shaft for raising and lowering said frame and said seeding unit.

21. An agricultural implement comprising a frame, a supporting wheel therefor, seed selecting mechanism including a drive shaft therefor carried by said frame, a swinging crank axle connecting said wheel with said frame, an arm connected with said crank axle for swinging the latter, a swiveled nut carried by said arm, a rotatable shaft supported on said frame and having a screw threaded end engaging said nut, means for preventing axial movement of said shaft, and means driven from said drive shaft for rotating said shaft optionally in either direction to raise and lower said frame relative to said ground engaging wheel.

22. An agricultural implement comprising means serving as a frame, a supporting wheel therefor, seed selecting mechanism, ground engaging tool means associated therewith and carried on said frame, means for driving said seed selecting mechanism from said ground wheel, means deriving power from said wheel for raising and lowering said tool means, means for adjusting the position of said frame and said tool means between the raised and lowered positions thereof, and means deriving power from the driving means for said seed selecting mechanism for actuating said adjusting means.

23. An agricultural implement comprising a frame, seed selecting mechanism supported on said frame, a driving shaft for said mechanism supported on said frame, means for driving said driving shaft, ground engaging tool means associated with said seed selecting mechanism and adjustable relative to the ground surface, means for adjusting the position of said tool means, and means on the frame deriving power from said driving shaft for actuating said adjusting means.

24. In a device as described, the combination of a supporting structure, a frame pivotally mounted therein, a driving shaft in alignment with one of the pivots of the frame, a rotatably driven shaft journalled in the frame and a combined clutch and drive mechanism for interengaging the driving shaft rotating in one direction to the driven shaft to rotate the driven shaft in opposite directions, the said pivotal mounting of the frame permitting the driven shaft to operate at various inclinations in reference to the supporting structure, the driven shaft having a screw thereon, a threaded sleeve engaging the screw and adapted to be moved in opposite directions on the screw of the driven shaft in accordance with its direction of rotation, the said sleeve having a pivotal connection to an oscillating structure, the pivotal connection of the sleeve to such oscillating structure being adapted to vary the inclination of the driven shaft, having the screw.

25. In a device as described in which an implement frame is provided with a ground wheel having an axle assembly and a crank-like connection from the axle assembly to the frame whereby at different inclinations of the crank-like connection the frame occupies different positions in reference to the ground level, combined with a first sprocket chain drive from the ground wheel to an idler gear assembly, said idler gear assembly being journaled in axial alignment with the crank connection to the implement frame, a second sprocket chain drive from the idler assembly to driven sprocket gear, said driven sprocket gear being mounted on a driving shaft, and means to journal said driving shaft in a fixed relation to the implement frame, a rotatable shaft journaled in a frame, the journals of the frame being in axial alignment with the driving shaft, and reversing clutch assembly and gear drive interconnecting the driving shaft with the pivoted shaft to rotate said pivoted shaft in opposite directions or to retain said shaft in a neutral position, and an operative connection between the pivoted shaft and the axle assembly to change the inclination of the crank-like connection for raising or lowering the implement frame in reference to the ground wheel.

26. In a device as described in which an implement frame has a crank-like shaft connection to an axle assembly carrying a ground wheel, a rotatable leveling shaft pivotally mounted in a journal structure, said journal structure being mounted in a fixed relation to the implement frame and parallel to the crank portion of the said crank-like connection and in which there is a raising and lowering connection between the leveling shaft and the axle assembly combined with a driving shaft mounted on a journal in axial alignment with the pivot of the leveling shaft, a gear connection from the ground wheel to the driving shaft to rotate said shaft in one direction, a combined clutch and driving assembly between the driving shaft and the leveling shaft to at will rotate said shaft in opposite directions or to retain said leveling shaft non-rotating when the clutch part of the clutch and gear assembly is in a neutral position.

27. In a device as described and claimed in claim 26, the gear drive between the ground wheel and the driving shaft including a first gear connection from the ground wheel to an idler gear assembly mounted on a journal in alignment with the crank part of the crank shaft connection from the implement frame to the axle assembly and a second gear connection from the idler gear assembly to the driving shaft.

28. An agricultural machine comprising the combination of a frame, means including a vertically swingable wheel for supporting said frame, an operating unit carried at least in part by said frame and raised and lowered by the swinging movement of said wheel, means including a shaft journaled on said frame and a clutch for driving said operating unit from said vertically swingable wheel, means also driven from said shaft for swinging said wheel to raise and lower said unit, and means responsive to the raising and lowering of said unit for controlling said clutch.

29. An agricultural implement comprising the combination of a frame, means including a vertically swingable wheel for supporting said frame, an operating unit carried at least in part by said frame and raised and lowered by the swinging movement of said wheel, means for swinging said wheel for raising and lowering said operating unit into and out of its transport position, means including a shaft journaled on said frame and a clutch for driving said operating unit from said vertically swingable wheel, means also driven from said shaft for swinging said wheel to adjust the operating position of said unit, mechanism for disengaging said clutch when said unit is raised into its transport position, and means to prevent said mechanism from disengaging said clutch when said unit is raised and lowered by the operation of said shaft and the means that adjusts the operating position of the unit.

WALTER H. SILVER.

CERTIFICATE OF CORRECTION.

Patent No. 2,192,333.    March 5, 1940.

WALTER H. SILVER.

It is hereby certified that error appears in the printed specification of the above numbered patent requiring correction as follows: Page 2, second column, line 11, for "principlas" read principles; page 6, first column, line 51, claim 12, for "overating" read operating; line 58, same claim, for "later" read latter; same page, second column, line 40, claim 15, for the word "driving" read drive; page 7, first column, line 7, claim 19, for "said" read seed; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.